United States Patent [19]

Meyer et al.

[11] 4,081,561

[45] Mar. 28, 1978

[54] PARTIALLY DECAFFEINATED SOLUBLE COFFEE PRODUCT AND METHOD THEREFOR

[75] Inventors: Franklyn Wallace Meyer, Bedford; Esra Pitchon, Flushing; Ernest Lord Earle, Jr., New City, all of N.Y.

[73] Assignee: General Foods Corporation, White Plains, N.Y.

[21] Appl. No.: 676,458

[22] Filed: Apr. 13, 1976

[51] Int. Cl.² .............................................. A23C 1/06
[52] U.S. Cl. .................................. 426/385; 426/432; 426/427
[58] Field of Search ............... 426/427, 428, 594, 388, 426/385

[56] References Cited

U.S. PATENT DOCUMENTS

| | | | |
|---|---|---|---|
| 228,889 | 6/1880 | Gue et al. | 426/427 |
| 1,015,271 | 1/1912 | Geisler | 426/427 X |
| 3,148,069 | 9/1964 | Sjogren et al. | 426/432 |
| 3,361,571 | 1/1968 | Nutting et al. | 426/428 X |
| 3,840,684 | 10/1974 | Fazzina et al. | 426/427 X |

FOREIGN PATENT DOCUMENTS 2,150,729  4/1973  Germany ........................ 426/427

OTHER PUBLICATIONS

Coffee Processing Technology by M. Siretz, vol. 2, published by Avi Pub. Co. Westport, Conn., 1963, p. 74.

*Primary Examiner*—Frank W. Lutter
*Assistant Examiner*—Frank Sever
*Attorney, Agent, or Firm*—Thomas R. Savoie; Daniel J. Donovan; Bruno P. Struzzi

[57] ABSTRACT

A low-grade roasted coffee fraction is extracted with water in manner sufficient to remove at least 75% of the caffeine contained therein while retaining a major amount of the soluble solids. Volatiles are stripped from the resulting extract and condensed. Thereafter the low grade fraction is thoroughly extracted with an aqueous extraction medium and this extract is combined, either before or after drying, with a fully caffeinated water extract of a high-grade coffee fraction and with condensed volatiles from the stripping operation. A partially decaffeinated soluble coffee having desirable flavor and aroma may be obtained.

2 Claims, No Drawings

PARTIALLY DECAFFEINATED SOLUBLE COFFEE PRODUCT AND METHOD THEREFOR

BACKGROUND OF THE INVENTION

A number of coffee drinkers have a concern about their level of caffeine consumption and many of these same consumers find that the aroma and/or flavor of the fully decaffeinated coffees presently available is unsatisfactory. These individuals are, therefore, likely to consume caffeinated coffee beverages but to minimize their intake of same. It is seen that a partially decaffeinated coffee beverage (say 40 to 60% decaffeinated) which approaches the flavor and aroma of fully caffeinated coffee beverages would enable the aforementioned consumers to increase their level of coffee consumption without increasing their intake of caffeine.

A process of producing a partially decaffeinated soluble coffee product which contains a flavor and aroma improvement over present decaffeinated soluble coffee products would be an advantageous advance in the art, especially if the process could be accomplished without the use of organic solvents and without the necessity of constructing and operating separate coffee decaffeination facilities.

It has been found that attempts to produce partially decaffeinated coffee by merely reducing the percent decaffeination effected in known decaffeination processes does not result in coffee products which are significantly improved in flavor and aroma over their fully (i.e. 97% or more) decaffeinated counterparts. Decaffeination processes such as water decaffeination of green beans, as described in U.S. Pat. No. 2,309,092 to Berry et al.; the solvent decaffeination of green beans, as described in U.S. Pat. No. 3,671,263 to Patel et al.; or the decaffeination of aqueous extracts of roasted coffee, such as described in U.S. Pat. No. 2,933,395 to Adler et al. are sufficiently detrimental to coffee flavor and aroma that use of these processes to effect any significant degree of decaffeination is readily detectable. In addition, all these processes include the use of organic solvents such as the chlorinated hydrocarbons, which solvents are subject to governmental regulation.

It would, of course, be conceivable to use one of the conventional decaffeination processes to produce a decaffeinated coffee fraction which is then combined with a fully caffeinated fraction, which fully caffeinated fraction is able to provide a measure of desirable aroma and flavor to the final coffee product and beverage. This procedure, however, does not avoid the use of chlorinated or other solvents. Furthermore, to practice this procedure the coffee processor would be forced to either construct and operate a decaffeination unit or purchase decaffeinated green beans from an outside supplier.

It would be desirable if a soluble partially decaffeinated coffee could be produced which did not involve the use of organic solvents and which could be obtained from soluble coffee processing equipment without the necessity to construct separate decaffeination facilities. Published West German Patent Application No. 2,150,729 describes a process for producing a decaffeinated soluble coffee product with conventional percolation equipment; however, the process described therein is economically unattractive and the product produced thereby would not be regarded as desirable by caffeinated soluble coffee consumers.

SUMMARY OF THE INVENTION

The present invention describes a process for the manufacture of a partially decaffeinated soluble coffee which coffee possesses a desirable flavor and aroma and which process is able to be implemented with conventional soluble coffee processing equipment. According to the process of this invention, a dilute aqueous extract is obtained from roasted and ground coffee, this extract having a soluble solids content below about 10% by weight, preferably below 7%, and producing a yield of soluble solids greater than about 12%, typically about 15 to 20% by weight of the roasted coffee (dry basis). This initial extract, which should contain at least 75% and preferably at least about 90% by weight of the caffeine present in the roasted coffee, is subjected to a vacuum or steam stripping operation in which a portion of the water and most or all of the volatile coffee components are vaporized. This vapor is recovered as a flavorful water fraction, essentially free of caffeine, in a condensing zone.

The roasted and ground coffee remaining after this initial extraction process is much reduced in caffeine content but still retains a large amount of soluble solids which can be extracted with aqueous extraction mediums such as in the conventional multi-stage, countercurrent percolation process well-known to those skilled in the art. This secondary extract, which may contain as little as about 10% of the caffeine originally present in the unextracted roasted and ground coffee, should contain a yield of soluble solids of at least 20% and preferably up to about 25 to 30% or more.

This secondary extract, preferably after concentration to about 35 to 50% soluble solids such as by evaporative or freeze concentration, may be combined with another extract obtained by extracting a second non-decaffeinated roasted and ground coffee fraction, preferably to a yield of at least 30% and typically about 35 to 40%. The resulting composite coffee extract will have a relatively low caffeine content and will be suitable for conversion to a soluble coffee powder. This low caffeine content will preferably be no more than about 40 to 60% of the caffeine level which would be present in an extract obtained by subjecting a comparably weighted blend of the first and second non-decaffeinated roasted and ground coffee fractions to conventional soluble coffee extraction processes.

As will be apparent to those skilled in the art, it will be possible to combine the secondary, low-caffeine extract with a fully-caffeinated extract either before or after a drying operation. When dried extracts are to be combined, it may be desirable to spray dry the low-caffeine extract and to combine this with freeze dried powder obtained by freeze drying the fully-caffeinated extract. It would also be possible to combine this secondary extract with fully-caffeinated soluble solids by various other techniques such as by using this extract as an aqueous extraction fluid for extracting a batch of fully-caffeinated roasted and ground coffee and to then dry the resulting extract.

Desirably the water condensate obtained from the aforementioned extract stripping operation will be added-back to the process so that the aroma and flavor compounds contained therein will be included in the partially decaffeinated soluble powder. Preferably, at least a portion of the condensate will be added to the secondary low-caffeine extract before it is dried, but after any concentration step that may be present; however condensate could also be added to the fully-caffeinated extract or to the soluble powder obtained from the separate or combined extracts.

DESCRIPTION OF THE PREFERRED EMBODIMENT OF THE INVENTION

Roasted and ground and fully-caffeinated coffee, preferably rich in low-grade coffee, is partially extracted with hot water in order to remove at least 75% of the caffeine contained therein, while removing only a minor amount of the total soluble solids contained therein. The temperature of the water fed to the coffee should be between 180° and 300° F., and preferably will be between about 230° and 270° F. This water extract is then vacuum stripped and the strippings condensed in accordance with well-known methods such as described in British Pat. No. 1,265,206. The condensate is collected and retained for possible incorporation in the partially-decaffeinated soluble coffee product. The caffeine-rich, water-extracted soluble solids can be added to other non-decaffeinated soluble solids either by combining liquid extracts or dry powders. In normal commercial operations where decaffeinated soluble products are produced at a much lower rate than non-decaffeinated soluble products, it will be possible to blend off the caffeine-rich solids in the non-decaffeinated product without significant impact.

The partially-extracted and preferably low-grade coffee is next further extracted, usually to exhaustion, in a secondary extraction step, with an aqueous extraction liquid. Preferably this extraction will be performed in a countercurrent, multi-stage battery of percolators, as is well-known to those skilled in the art, and the aqueous extraction liquid will be a second-stage extract which is a hot aqueous solution of roasted coffee solubles essentially free of caffeine. This secondary extract, which will have a relatively low caffeine content, is preferably evaporatively concentrated to a high solids level.

In a separate extraction process a roasted and ground and fully-caffeinated coffee, preferably rich in high-grade coffees, is extracted in a conventional manner, such as in a countercurrent, multi-stage percolation battery to a roasted yield of about 35 to 40% by weight while producing an aqueous extract typically having about a 20 to 30% soluble solids concentration. This extract is combined with the concentrated, low-caffeine secondary extract of the preferably low-grade coffee blend and also with at least a portion of the vacuum stripped condensate and then dried by such conventional means as spray drying, low-temperature spray drying or freeze drying.

As used in this invention, what is meant by "high grade" coffee is the more expensive coffees such as Santos and Milds which are of the Arabica variety, with the Santos coffees being relatively non-aromatic or neutral flavored in the coffee group, while the Mild coffees are very fragrant and acidy when they are of the high-grown type and somewhat thinner in aroma and body when of the "low-grown" type. On the other hand, what is meant by "low grade" coffee is the cheaper or relatively inexpensive coffee such as Robusta, which is botanically classified as of the canephora variety, and is generally considered as having poor flavor characteristics. As described above, it is preferable to use most, if not all, of the low-grade coffees of a given coffee blend for producing the concentrated low-caffeine extract and most, if not all, of the high-grade coffees for producing the conventional caffeinated extract. In this manner the high-grade coffee solubles and the volatile aromatics contained therein will not be subjected to an evaporation step where loss of aromatics is possible.

It will, of course, be possible to control the decaffeination level of the final product by adjusting the amount of low-caffeine solids which are combined with the fully caffeinated solids. Generally decaffeination levels of about 40 to 60% will be desirable. It will be advantageous, in order to attain a higher decaffeination level, to employ roasted and ground coffee having a relatively high (e.g., above 2% by weight) caffeine level as the coffee from which the caffeine-rich water extract is removed and a roasted and ground coffee having a relatively low (e.g., below 1.5% by weight) caffeine level as the coffee from which the fully caffeinated extract is obtained. Low-grade coffees such as Robusta are generally found to have a higher caffeine content than the high-grade coffees such as Santos and Milds.

A preferred embodiment of this invention is more fully described in the following Example.

EXAMPLE 1

Water at 250° F. was fed through a column of fresh roasted and ground Robusta coffee, having a caffeine content of 2.4% by weight, and a caffeine-rich extract containing a 17.5% yield and a 5.1% soluble solids concentration was removed. Thereafter this column was connected as the fresh stage of a four column countercurrent extraction battery and a second stage extract was introduced to remove a low caffeine extract having a 29.4% yield and an 11.8% soluble solids concentration. Thereafter the column was moved through the extraction battery where the column feed temperatures steadily increased to a maximum of 350° F. The caffeine-rich extract was found to contain about 90% of the extracted caffeine while the low-caffeine, secondary extract was found to contain about 10% of the extracted caffeine.

About 10% (by weight) of the caffeine-rich extracts were vacuum stripped and the resultant volatile-containing water vapor was condensed.

The low caffeine extract was evaporatively concentrated to 50% soluble solids and then split into two equal fractions for further processing. To one fraction one-half of the above-mentioned condensate was added. The second fraction had no condensate added.

A fully caffeinated roasted and ground coffee blend consisting of three parts Colombian mild-type coffee and two parts Santos coffee and having a caffeine content of about 1.2% by weight was extracted to a 37.8% roasted yield employing a five stage countercurrent percolation battery, again with a maximum 350° F feed temperature. A portion of this extract, which contained a soluble solids level of 23.6% by weight, was combined with each of the two low-caffeine extract fractions at a 50% by weight soluble solids level. A portion of each of these composite extracts was spray dried and a portion of each extract was freeze dried.

EXAMPLE 2

Control freeze dried and spray dried powders were obtained by extracting a roasted and ground coffee blend comprised of 30 parts Milds, 20 parts Santos and 50 parts Robustas and having a caffeine content of about 1.8% by weight with 250° F. water to a yield of 16.4%, producing a caffeine-rich extract having a soluble solids content of 6.6%. Vacuum strippings in the amount of 10% by weight were removed from this extract as in Example 1. The partially extracted coffee blend was then further extracted to an additional 29.2% yield, in a four stage percolator set, as in Example 1, producing a low-caffeine extract at 11.7% solids which was then concentrated to 44% solids and combined with the condensed strippings. Fractions of this flavor-bearing extract are then both spray dried and freeze dried as in Example 1.

EXAMPLE 3

The relative quality of the respective spray dried and freeze dried powders of Examples 1 and 2 were measured by performing Gas Chromatographic Analysis on the six dried powders. The results were as follows. (The units representing area under a curve):

|  | % Decaf- feination | G.C. Area | |
| --- | --- | --- | --- |
|  |  | Spray Dried | Freeze Dried |
| Example 1 (w/condensate) | 56 | 34.10 | 86.28 |
| Example 1 (w/o condensate) | 56 | 32.69 | 60.00 |
| Example 2 (control) (w/condensate) | 60 | 22.60 | 33.51 |

As can be seen from the above Examples, a partially decaffeinated soluble coffee product can be prepared employing conventional percolation equipment and without the use of organic solvents. As can be seen from the gas chromatographic data, the soluble products of this invention possess a relatively high level of aromatics, with or without the addition of condensate although adding condensate provides for significant further increase in aromatics, especially when a freeze dried product is prepared.

Having thus described the invention what is claimed is:

1. A method for producing a partially decaffeinated soluble coffee product comprising the steps of:
    (a) extracting a non-decaffeinated, low-grade roasted and ground coffee fraction with 180° F. to 300° F. water to a roasted yield greater than about 12% by weight, the resulting water extract containing below about 10% soluble solids by weight and at least 75% of the caffeine contained in said low-grade coffee fraction,
    (b) thereafter extracting this low-grade coffee fraction with an aqueous extraction medium to an additional roasted yield of at least 20% by weight, and
    (c) stripping volatiles from the extract of step a) and condensing and combining these volatiles with the soluble solids contained in the extract of step b),
    (d) water extracting a high-grade non-decaffeinated roasted and ground coffee fraction,
    (e) combining the extract of step d) with the extract of step b) and then,
    (f) drying the resulting mixture.
2. The method of claim 1 wherein the mixture is freeze dried.

* * * * *